(12) United States Patent
Beck et al.

(10) Patent No.: US 8,611,568 B2
(45) Date of Patent: Dec. 17, 2013

(54) HYDROPHOBIC ABS PLASTICS MATERIAL FOR CASINGS

(75) Inventors: Daniela Beck, Erlangen (DE); Anett Berndt, Erlangen (DE); Florian Eder, Erlangen (DE)

(73) Assignee: Siemens Medical Instruments Pte. Ltd., Singapore (SG)

( * ) Notice: Subject to any disclaimer, the term of this patent is extended or adjusted under 35 U.S.C. 154(b) by 0 days.

(21) Appl. No.: 13/422,339

(22) Filed: Mar. 16, 2012

(65) Prior Publication Data

US 2012/0238702 A1  Sep. 20, 2012

(30) Foreign Application Priority Data

Mar. 16, 2011  (DE) .................. 10 2011 005 630

(51) Int. Cl.
  *H04R 25/00*   (2006.01)
  *C08L 83/08*   (2006.01)
  *C08L 83/06*   (2006.01)
  *C08L 83/04*   (2006.01)

(52) U.S. Cl.
  USPC .................. 381/312; 525/100; 525/102

(58) Field of Classification Search
  None
  See application file for complete search history.

(56) References Cited

U.S. PATENT DOCUMENTS

| | | | |
|---|---|---|---|
| 3,919,157 A | 11/1975 | Ide et al. | |
| 4,248,778 A | 2/1981 | Arnold et al. | |
| 4,305,856 A | 12/1981 | Sakano et al. | |
| 4,810,743 A | 3/1989 | Mundhenke | |
| 4,811,402 A * | 3/1989 | Ward | 381/322 |
| 4,957,964 A | 9/1990 | Okumura et al. | |
| 5,306,770 A | 4/1994 | Kojina et al. | |
| 5,654,366 A | 8/1997 | Furukawa et al. | |
| 5,760,120 A | 6/1998 | Itoh et al. | |
| 2004/0192846 A1 | 9/2004 | Oepen et al. | |
| 2006/0142486 A1 | 6/2006 | DeRudder et al. | |
| 2008/0031481 A1* | 2/2008 | Warren et al. | 381/322 |
| 2011/0046306 A1* | 2/2011 | Serhatkulu | 525/66 |
| 2011/0299708 A1* | 12/2011 | Bondo et al. | 381/312 |
| 2012/0189148 A1* | 7/2012 | Bewley et al. | 381/322 |

FOREIGN PATENT DOCUMENTS

| | | | | |
|---|---|---|---|---|
| CA | 2042223 | * | 12/1991 | C08L 83/04 |
| DE | 2 039 022 B2 | | 2/1971 | |
| DE | 38 87 502 T2 | | 8/1994 | |
| DE | 695 03 861 T2 | | 1/1999 | |
| EP | 0022979 A1 | | 1/1981 | |
| EP | 0196092 A2 | | 10/1986 | |
| EP | 0388231 A1 | | 9/1990 | |
| EP | 0728809 A2 | | 8/1996 | |
| JP | 56016552 A | | 2/1981 | |
| JP | 10046003 A | | 2/1998 | |
| KR | 2007007535 A | | 1/2007 | |

* cited by examiner

*Primary Examiner* — Robert S Loewe
(74) *Attorney, Agent, or Firm* — Laurence A. Greenberg; Werner H. Stemer; Ralph E. Locher

(57) ABSTRACT

A hydrophobic ABS plastics material is formed from an acrylonitrile-butadiene-styrene copolymer (ABS) plastic feed stock and a silicone additive. The hydrophobic ABS plastics material is used to produce a casing material, and also an electrical device. The hydrophobic ABS plastics material is ideally suited for protecting sensitive electronic components from moisture via a casing.

4 Claims, No Drawings

HYDROPHOBIC ABS PLASTICS MATERIAL FOR CASINGS

CROSS-REFERENCE TO RELATED APPLICATION

This application claims the priority, under 35 U.S.C. §119, of German application DE 10 2011 005 630.0, filed Mar. 16, 2011; the prior application is herewith incorporated by reference in its entirety.

BACKGROUND OF THE INVENTION

Field of the Invention

The invention relates to a hydrophobic ABS plastics material, to a process for production of the same and to use of the same as a casing material, and also to an electrical device made of the material.

Acrylonitrile-butadiene-styrene copolymer (abbreviated to ABS) is a plastic with high surface hardness for scratch-resistant and matt-luster surfaces, and has good impact resistance. It is used for the production of casings, in particular casings of electrical devices.

Electrical devices, e.g. hearing aids, mobile phones, and the like, have exposure to dirt, moisture, and sweat during daily use. Moisture which penetrates into the device and reaches electronic components can cause corrosion and finally damage to the components, and indeed can cause the device to fail. It is therefore known that entire casings or individual device components can be provided at the surface with a moisture-repellant and/or dirt-repellant protective layer. The effect is best when all of the casing components have been provided with this type of surface.

Since device casings mostly contain various plastics parts, liquids can penetrate through joints between the casing parts, and are attracted by capillary forces into the device. The wetting properties of the casing material can be described by using the water contact angle (WCA) and the receding contact angle (RCA). If water contact angles are small (e.g. from 0 to 45°), the surface is termed hydrophilic, if angles are around 90° it is termed hydrophobic, and if angles are even larger it is termed superhydrophobic. The contact angle can be altered through surface treatment. The receding angle can be considered to be a measure of the dewetting properties of a surface, and gives an indication of easy cleaning. This value describes the force or energy required to remove a substance which has already adhered to the relevant surface. It is mostly somewhat smaller than the water contact angle, but here again the rule is that as a material becomes more hydrophobic the receding angle mostly increases.

Although the surface properties of ABS can give the casing material an adequate initial level of hydrophobic properties (WCA about 75°, RCA about 50°), the surface properties rapidly become poorer in a moist environment (RCA<20) or in contact with sweat (RCA<30).

For improvement of surface properties, published European patent application EP 1 432 281 A2, corresponding to U.S. Pat. No. 7,702,124, discloses a hearing aid in which constituents of the casing have a hydrophobic and/or oleophobic and/or biofilm-inhibiting coating.

However, the coating of individual casing parts leads to a complex production process and is not feasible for all components, since certain process steps during production, e.g. adhesive bonding, lacquering, or printing, are not achievable on hydrophobic surfaces. The application of the coating also requires additional operations (e.g. coating, drying, curing) and appropriate specific production plant. Coatings are moreover disadvantageous because they can be removed through mechanical stress (friction).

SUMMARY OF THE INVENTION

It is therefore the object of the invention to provide a hydrophobic ABS plastics material, a process for production of the same and to use of the same as casing material, where this can protect sensitive electronic components in a casing from moisture.

The invention provides a composition containing an ABS plastic and a silicone additive.

An ABS plastic is a plastic which contains an acrylonitrile-butadiene-styrene copolymer.

The silicone additive contains a polyorganosiloxane. Polyorganosiloxanes are also generally termed "polysiloxanes", "silicone plastics", or "silicones".

The polyorganosiloxane can have been copolymerized with a further polymer (the term used then being polysiloxane copolymer).

It is preferable that the invention provides a composition where the silicone additive is a polyorganosiloxane having side chains which have been selected independently of one another from the group consisting of unsubstituted alkyl group, unsubstituted alkenyl group, substituted alkyl group, and substituted alkenyl group, where a substituted alkyl group or alkenyl group has at least one substituent selected from the group consisting of hydroxy group (—OH), epoxy group, ether group (—(CH2)nOR), or primary amino group (—NH2), or secondary amino group (—NHR).

The polyorganosiloxane can have the structure given in the following formula:

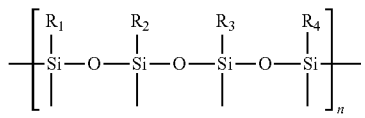

where R1, R2, R3, and R4 are side chains selected independently of one another from the group consisting of unsubstituted alkyl group, unsubstituted alkenyl group, substituted alkyl group, and substituted alkenyl group, where a substituted alkyl group or alkenyl group has at least one substituent selected from the group consisting of hydroxy group (—OH), epoxy group, ether group (—(CH2)nOR), or primary amino group (—NH2), or secondary amino group (—NHR).

In accordance with the structural formula shown above, there are methyl groups (—CH3) filling the vacant positions on the silicon atoms, to the extent that they do not have bonding to oxygen or to one of the side chains R1 to R4.

In accordance with one aspect of the invention it is preferable that R1, R2, R3, and R4 indicate an identical side chain.

In accordance with one aspect of the invention, it is preferable that respectively R1 and R3 indicate an identical side chain, and also that R2 and R4 indicate an identical side chain.

In accordance with one aspect of the invention, it is preferable that the silicone ether chain of the silicone additive respectively has termination by a side chain in accordance with one of the side chains of R1 to R4.

In accordance with one aspect of the invention, it is preferable that the proportion by weight of the silicone additive is ≤20% by weight. The proportion by weight of the silicone additive is particularly ≤10% by weight.

The proportion by weight of the silicone additive is particularly from 2 to 6% by weight. This proportion by weight of the silicone additive gives an adequate improvement of hydrophobic properties of the composition together with low total costs.

In accordance with one aspect of the invention, it is preferable that the silicone additive is a polyorganosiloxane selected from the group consisting of polyorganosiloxanes having one of the structures given in the following formulae:

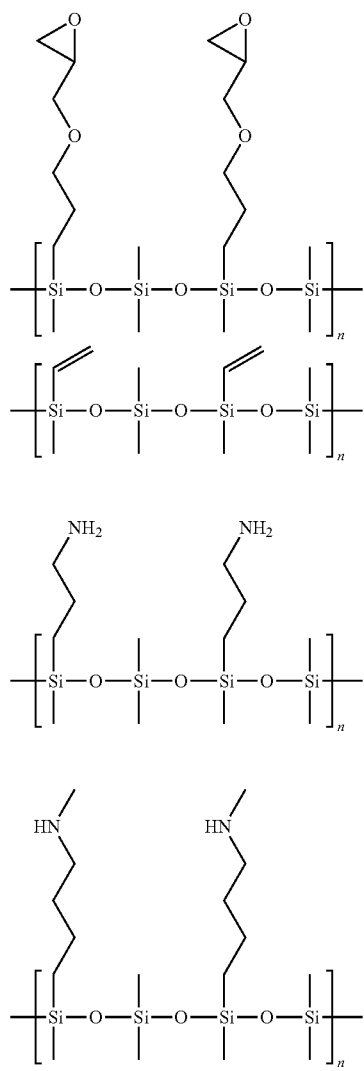

In accordance with the structural formulae shown above, there are methyl groups (—CH3) filling the vacant positions on the silicon atoms, to the extent that they do not have bonding to oxygen or to a side chain designated in more detail.

In accordance with one aspect of the invention, it is preferable that the molecular weight of the polyorganosiloxane is ≤5000. This proportion by weight of the silicone additive gives an adequate improvement of hydrophobic properties of the composition together with low total costs.

In accordance with one aspect of the invention it is preferable that the number of Si—O— units in the polyorganosiloxane is ≤70.

The composition of the invention can contain further additives, e.g. dyes, flow agents, and the like.

The invention further provides a process for production of the composition described above, where the silicone additive is added to an ABS plastics feedstock and is mixed together with the ABS plastics feedstock and optionally heated.

In accordance with one aspect of the invention, it is preferable that the silicone additive is added to an ABS plastics feedstock and is heated together with the ABS plastics feedstock, and extruded.

The invention further provides a use of the composition of the invention for the production of a hydrophobic casing material, in particular for the production of a hearing-aid casing.

The invention further provides a casing for an electrical device which contains the composition of the invention.

The invention further provides an electrical device with a casing which contains the composition of the invention.

The invention further provides a hearing aid with a casing which contains the composition of the invention.

DETAILED DESCRIPTION OF THE INVENTION

The invention is based on the idea that, instead of coating a plastics casing, an additive compatible with the ABS plastic is added to the ABS plastics feedstock for a casing, in order to obtain the composition of the invention with improved hydrophobic properties.

It has been found here that in particular the silicone additives used in accordance with the invention are compatible with the ABS feedstock and moreover are suitable for achieving the desired properties of the material.

The polyorganosiloxanes used preferably have the following structure:

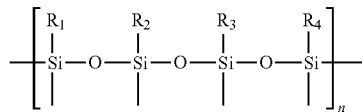

R1, R2, R3, and R4 here are saturated or unsaturated aliphatic hydrocarbon side chains. The side chains can have substitution, for example by hydroxy groups (—OH), epoxy groups, ether groups (—(CH2)nOR), or a primary amine (—NH2) or secondary amine (—NHR), or a vinyl group.

In accordance with the structural formula shown above, there are methyl groups (—CH3) filling the vacant positions on the silicon atoms, to the extent that they do not have bonding to oxygen or to a side chain designated in more detail.

They can respectively have single or multiple substitution.

R1 to R4 can be identical or respectively different.

The polyorganosiloxane can have 2, 3, or 4 different side chains of the type described above, and these can alternate in a regular manner (for example aabb, abab, aabbcc, abcabc) or in an irregular manner.

A preferred polyorganosiloxane is polydimethylsiloxane.

The side chains can be utilized for cross-linking with the polymer, as shown in the structural formula below, where R1 in the structural formula designates the ABC polymer:

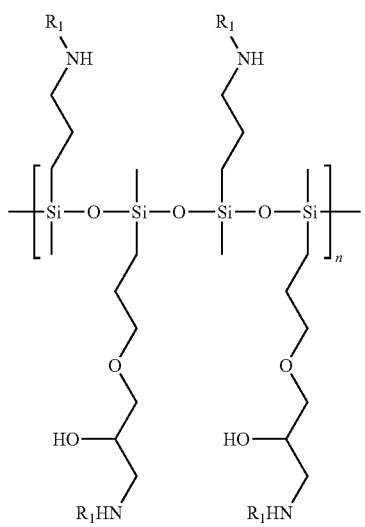

In accordance with the structural formulae shown above, there are methyl groups (—CH3) filling the vacant positions on the silicon atoms, to the extent that they do not have bonding to oxygen or to a side chain designated in more detail.

In this example, the main silicone chain bears, in alternation, a side chain having an amino group and having an epoxy group.

Surprisingly, it has been found that polyorganosiloxanes are suitable as additives for ABS plastic and improve the hydrophobic properties thereof. The composition of the invention therefore in particular has particularly good suitability for the use of casings for moisture-sensitive devices, in particular electrical devices.

The device casing has inter alia the task of protecting the interior of the device from environmental effects. This is particularly important for devices which are used under particular conditions, e.g. in outdoor use, or devices carried on the person. Examples of these are mobile telephones, hearing aids, portable MP3 players, cameras, computers, and similar devices.

The inventors have surprisingly found that the composition of the invention is suitable for applications of this type, since the casing material has long lasting moisture repellency.

The main silicone chain contributes to the desired improvement of hydrophobic properties.

The composition of the invention is therefore particularly suitable for hearing-aid casings, since hearing aids are worn on the person and therefore come into contact with moisture, sweat, body care products or cosmetic products, and cerumen (earwax). It has been shown that the composition of the invention is particularly resistant to the substances and that the hydrophobic properties of the casing material can be retained over a greatly prolonged period.

Use of the silicone additive can provide long lasting improvement of hydrophobic properties (measured via WCA and RCA), i.e. the plastic retains the properties for a markedly longer time than without use of the silicone additive. In contrast to the known processes of surface treatment, the production of the ABS plastics material with silicone additive requires no additional operations. The silicone additive can by way of example be added prior to extrusion, e.g. during compounding. The silicone additive can also be added directly prior to the injection-molding process. The materials costs for silicone additives of this type are low (<20 USD per kg), and total costs can therefore be kept low. Use of existing production processes and of existing production plant can continue.

An example of a production process can be carried out with the following conditions:
Compounding Parameters:
Screw diameter: 25 mm, L/D 40
Barrel temperatures: 230° C.
Screw rotation rate: 250 rpm
Throughput: 8 kg/h
Torque: about 25-30%
from 2.5% by weight to 6% by weight of silicone additive.

The additive is added to the finished plastic. The juncture of addition, i.e. either during the injection-molding itself, or during the previous compounding process, is of no significance.

In order to investigate hydrophobic properties, WCA and RCA values were determined for ABS plastic without silicone additive, ABS plastic with 6% by weight of polysiloxane-polyester copolymer, and ABS plastic with 2.5% by weight of polyamino organosiloxane and 4% by weight of polysiloxane-polyester copolymer.

The WCA value for ABS plastic without silicone additive was about 75°, and it was respectively about 85° for ABS plastic with 6% by weight of polysiloxane-polyester copolymer and ABS plastic with 2.5% by weight of polyamino organosiloxane and 4% by weight of polysiloxane-polyester copolymer.

The RCA value of ABS plastic without silicone additive was about 50°, for ABS plastic with 6% by weight of polysiloxane-polyester copolymer the RCA value was about 60°, and for ABS plastic with 2.5% by weight of polyamino organosiloxane and 4% by weight of polysiloxane-polyester copolymer the RCA value was about 75°.

After various types of treatment of a plastics specimen, e.g. 40° C. at 100% relative humidity, treatment with sun cream, aftershave, and with various temperature and moisture cycles, and also treatment by abrasion, it was found that the ABS plastic without silicone additive exhibited marked impairment of hydrophobic properties (decrease in RCA value), whereas in the case of ABS plastic with the tested silicone additives there was retention of hydrophobic properties.

The RCA value of the ABS plastic without silicone additive decreased from about 50° to about 15° after treatment with 40° C. at 100% relative humidity for 3 weeks.

In contrast, the RCA value of ABS plastic with 6% by weight of polysiloxane-polyester copolymer decreased from about 60° only to about 50-55° after treatment with 40° C. at 100% relative humidity for 3 weeks.

The RCA value of ABS plastic with 2.5% by weight of polyamino organosiloxane and 4% by weight of polysiloxane-polyester copolymer decreased from about 75° only to about 65° after treatment with 40° C. at 100% relative humidity for 3 weeks.

The invention claimed is:

1. A hearing aid, comprising:
a hearing aid casing formed from an acrylonitrile-butadiene-styrene copolymer (ABS) plastic and a silicone additive;
said silicone additive containing a polyorganosiloxane having side chains which have been selected independently of one another from the group consisting of unsubstituted alkyl group, unsubstituted alkenyl group, substituted alkyl group, and substituted alkenyl group; and
said substituted alkyl group or said substituted alkenyl group having at least one substituent selected from the group consisting of a hydroxy group (—OH), an epoxy group, a primary amino group (—NH2), and a secondary amino group (—NHR).

2. The hearing aid according to claim 1, wherein a proportion by weight of said silicone additive is ≤20% by weight.

3. A hearing aid, comprising:

a hearing aid casing formed from an acrylonitrile-butadiene-styrene copolymer (ABS) plastic and a silicone additive;

said silicone additive containing a polyorganosiloxane having side chains which have been selected independently of one another from the group consisting of an unsubstituted alkyl group, an unsubstituted alkenyl group, a substituted alkyl group, and a substituted alkenyl group;

a molecular weight of said polyorganosiloxane is ≤5,000; and said substituted alkyl group or said substituted alkenyl group has at least one substituent selected from the group consisting of a hydroxy group (—OH), an epoxy group, a primary amino group (—NH2), and a secondary amino group (—NHR).

4. A hearing aid, comprising:

a hearing aid casing formed from an acrylonitrile-butadiene-styrene copolymer (ABS) plastic and a silicone additive;

said silicone additive containing a polyorganosiloxane having side chains which have been selected independently of one another from the group consisting of an unsubstituted alkyl group, an unsubstituted alkenyl group, a substituted alkyl group, and a substituted alkenyl group;

a number of Si—O— units in said polyorganosiloxane is ≤70; and said substituted alkyl group or said substituted alkenyl group has at least one substituent selected from the group consisting of a hydroxy group (—OH), an epoxy group, a primary amino group (—NH2), and a secondary amino group (—NHR).

* * * * *